Jan. 28, 1936.  A. L. ROSENMUND  2,029,124
SEALING MEANS FOR WIREBOUND BOXES
Filed March 3, 1934  2 Sheets-Sheet 1

INVENTOR.
Alfred L. Rosenmund
BY
Blair, Curtis & Dunne
ATTORNEYS.

Jan. 28, 1936. A. L. ROSENMUND 2,029,124
SEALING MEANS FOR WIREBOUND BOXES
Filed March 3, 1934 2 Sheets-Sheet 2
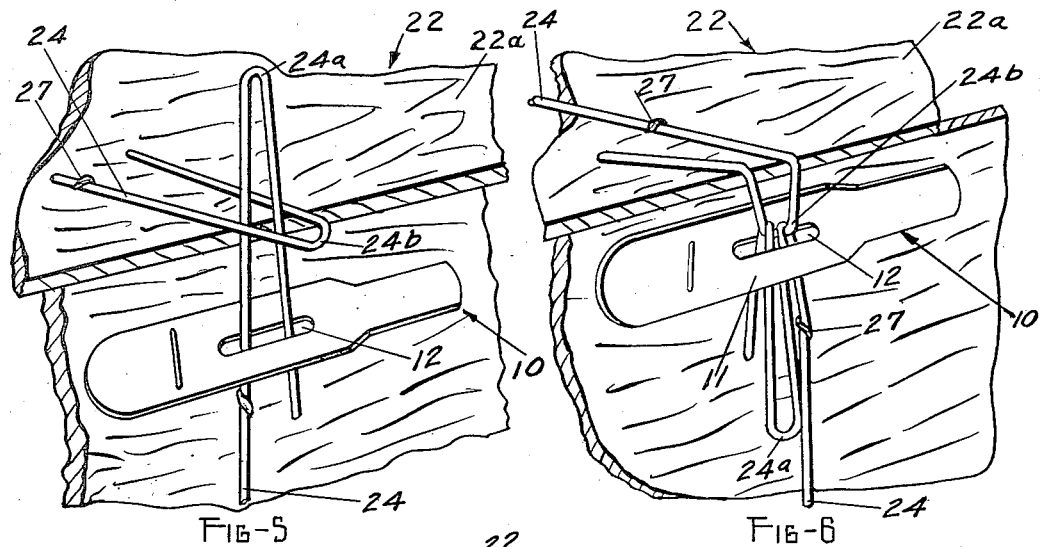
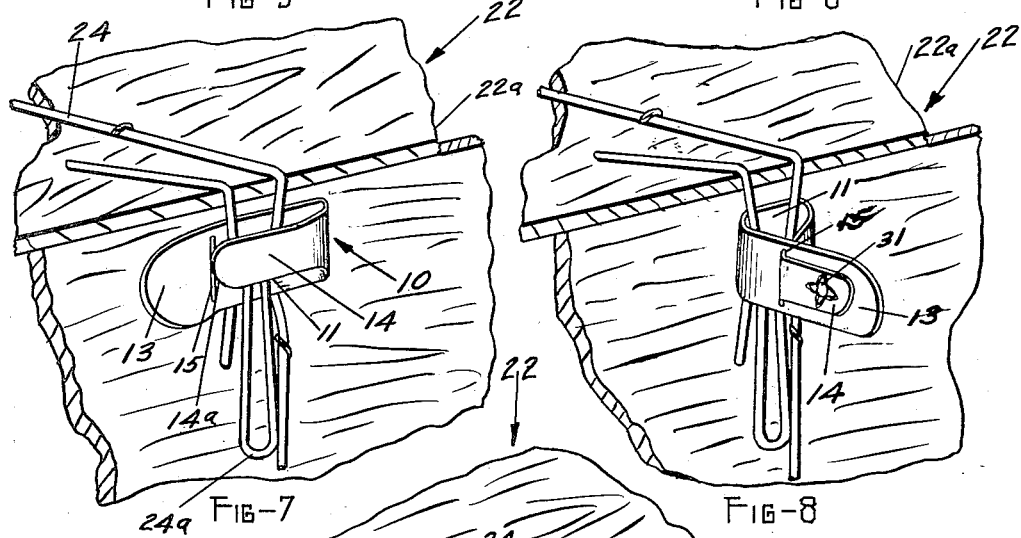
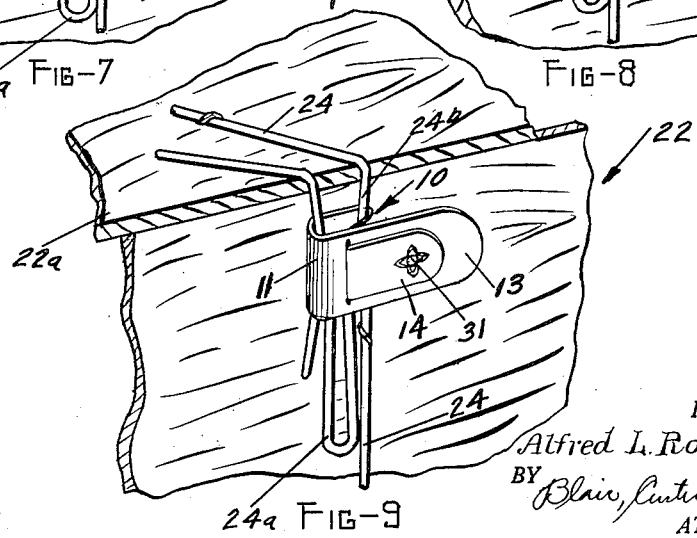
INVENTOR.
Alfred L. Rosenmund
BY Blair, Curtis + Dunne
ATTORNEYS.

Patented Jan. 28, 1936

2,029,124

UNITED STATES PATENT OFFICE 2,029,124

SEALING MEANS FOR WIREBOUND BOXES

Alfred L. Rosenmund, Rockaway Borough, N. J., assignor to Stapling Machines Co., a corporation of Delaware Application March 3, 1934, Serial No. 713,833

2 Claims. (Cl. 292—325)

This invention relates to a sealing means and method for wirebound boxes and particularly for wirebound boxes in which the wire ends are provided with bights or loops hooked together to releasably complete the continuity of the wire bindings.

One of the objects of this invention is to provide a simple and practical seal for the purpose described which is inexpensive to manufacture and capable of rapid application.

Another object is to provide a seal which when applied to the united or hooked wire ends will be held thereby against displacement and will so cover the united or hooked ends as to prevent disconnecting or unhooking them without first breaking the seal.

Another object is to provide a seal which when applied to joined ends, cannot be opened without so mutilating the seal as to give evidence of the opening thereof.

Another object is to provide a seal which may be rapidly and easily unsealed.

Another object is to provide a method of effectively sealing wire ends and more particularly ends provided with bights or loops hooked together.

Other objects will be in part apparent and in part pointed out hereinafter.

The invention accordingly consists in the features of construction, combinations of elements, arrangements of parts, and in the several steps and relation and order of each of the same to one or more of the others, all as will be illustratively described herein, and the scope of the application of which will be indicated in the subjoined claims.

In the accompanying drawings, in which is shown one of the various possible embodiments of my invention and in which the several steps of my method are illustratively indicated:—

Fig. 5 is an enlarged perspective view of a portion of the box in Fig. 4 showing the first step in the application of the seal.

Fig. 6 is a similar perspective view showing the second step in the application of the seal.

Fig. 7 is a similar perspective view showing the third step in the application of the seal.

Fig. 8 is a similar perspective view showing the fourth step in the application of the seal.

Fig. 9 is a similar perspective view showing the fifth step in the application of the seal.

Similar reference characters refer to similar parts through the several views of the drawings.

As conducive to a clearer understanding of my invention it might here be pointed out that the sealing and unsealing of wire ends or the like by a metal seal is subject to many conditions which lend not only inconvenience but time-consuming labor to an otherwise simple operation. Many seals are not only difficult to put on due to their stiffness but are extremely difficult to remove without a special tool or without irreparably damaging the binding wire or the like. Those which are not so stiff are ineffective as seals because of their tendency to break or become dislocated in the handling of the box. Other prior seals are characterized by unduly expensive construction.

Figure 1:
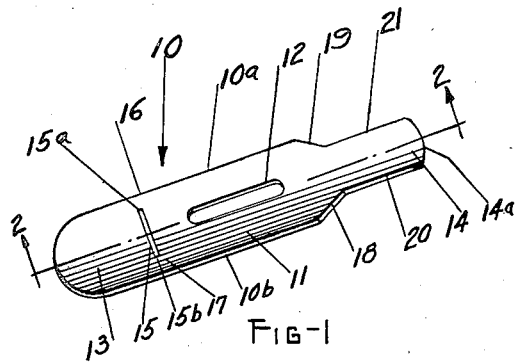
Figure 1 is a perspective view of the top of my seal before its application to the wire ends of a box.

Referring now to Fig. 1, there is generally indicated at 10 a strip of preferably ductile metal as, for example, cold-rolled iron or a zinc alloy. Strip 10 may be of any suitable weight according to the strains to which it is subjected and is preferably of uniform thickness throughout.

Figure 2:
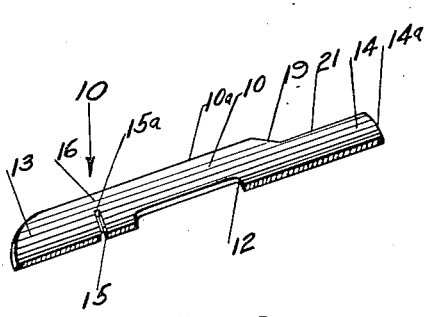
Fig. 2 is a perspective vertical sectional view of my seal taken along the line 2—2 of Fig. 1.

Strip 10 comprises a central portion 11 provided with a longitudinal slot 12, an end portion 13, and another end portion 14. The free end of portion 13 which is preferably rounded and equal in width to body portion 11 is provided with a slot 15 running cross-wise the strip 10 a distance from the adjacent end of the slot 12. As more clearly shown in Fig. 2, the ends of slot 15 which are designated respectively 15a and 15b, are substantially spaced from edges 10a and 10b of strip 10, to provide integral portions 16 and 17 to maintain the strength of strip 10 and accordingly prevent a rupture between body portion 11 and end 13, all as will be more fully described hereinafter.

End 14 may be formed by cutting or stamping strip 10 to form inwardly extending edges 18 and 19, longitudinally extending edges 20 and 21, and a rounded free end 14a. Edges 20 and 21 are preferably co-extensive in parallel relationship. End 14 hereinafter referred to as the "tongue" of strip 10, is preferably slightly less in width than the length of slot 15, and slot 15 is preferably slightly wider than the thickness of tongue 14, so that the tongue 14 may be readily passed through slot 15 for the purpose and in the manner hereinafter described.

Figure 4:
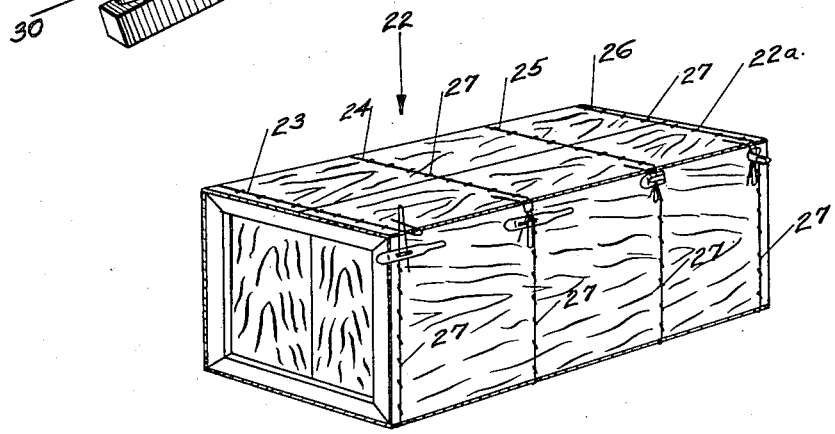
Fig. 4 is a perspective view of a wirebound box showing the various steps in sealing the wire ends.

Referring now to Fig. 4, there is generally indicated at 22 a box bound by any suitable number of wires, for example, by wires 23, 24, 25 and 26, which are preferably secured to the sides of the box by a suitable number of staples 27.

As more clearly shown in Fig. 5, the ends of the wire 24 are provided with bights or loops 24a and 24b, bight 24a being positioned within bight 24b. However, before bight 24a is so positioned, strip 10 is placed upon it so that the bight enters slot 12 until strip 10 is positioned preferably substantially below the top 22a of the box 22. Bight 24a is then forced outwardly and downwardly into the position shown in Fig. 6 so that it lies across body 11 of strip 10. During this operation bight 24b is bent over the corner edge of box 22 so that it lies substantially in the same plane as bight 24a.

Under certain conditions it might be desirable that both bights were so positioned and bent as to lie on the top 22a of box 22 instead of the side thereof. In that event bight 24b is inserted in slot 12 before being placed within bight 24a, the bight then being bent and drawn together substantially as pointed out above, except in the opposite direction.

Figure 3:
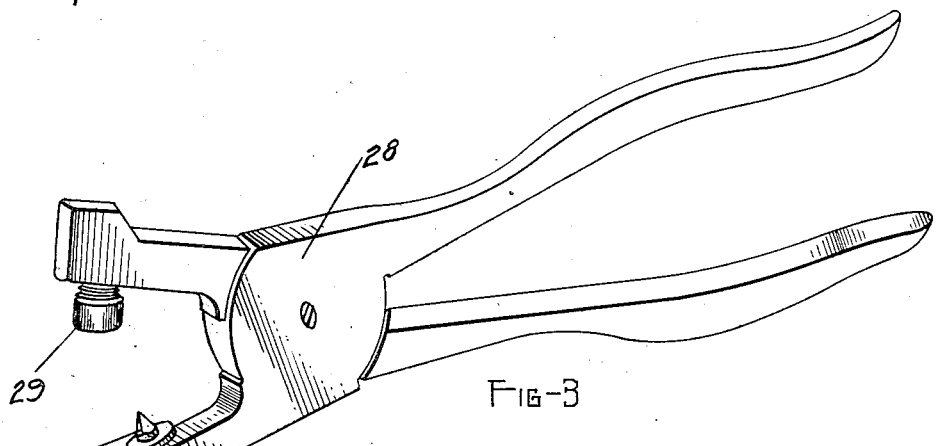
Fig. 3 is a perspective view of a sealing or crimping tool which may be used in the application of the seal.

As best shown in Fig. 7, after the bights 24a and 24b are drawn tightly together, tongue 14 is bent over the hooking engagement between the bights 24a and 24b. In this position the end of the tongue 14 lies adjacent to and in alignment with the slot 15. Tongue 14 is then inserted in slot 15, and the end 13 of strip 10 and the inserted tongue 14 are bent into an outwardly extending position, as more clearly shown in Fig. 8. While in this position tongue 14 and end 13 are secured together in any suitable manner, but preferably by crimping. A suitable crimping tool for this purpose is shown in Fig. 3 and designated 28. It is provided with crimping jaws 29 and 30 adapted to pierce and crimp tongue 14 and end 13, thus securing them together. The crimp (designated 31 in the drawings) is preferably of such a character and shape that after end 13 and tongue 14 are pulled apart, the crimped portions thereof are so mutilated and damaged that the crimp cannot be restored without leaving evidence of tampering.

The final operation is more clearly shown in Fig. 9. After crimping end 13 and tongue 14, they are bent over until they lie flat against the side of the box.

Among the many advantages that accrue to a seal and method of sealing as described herein are inexpensive manufacture, rapid production, easy application, sturdy and durable sealing, and ease of unsealing.

Thus it will be seen that I have provided a thoroughly practical and efficient seal and method of sealing, in which the several objects referred to hereinabove, as well as many others, are successfully and practically accomplished.

As many possible embodiments may be made of the mechanical features of the above invention and as the art herein described might be varied in various parts, all without departing from the scope of the invention, it is to be understood that all matter hereinabove set forth or shown in the accompanying drawings is to be interpreted as illustrative and not in a limiting sense.

I claim:

1. In combination with a wirebound box having interengaged bights formed on the wire ends at the closing corner of the box, a seal comprising a metallic strip having a pair of slots extending therethrough, one of said slots running substantially centrally and longitudinally of the strip to receive one of the bights on the end of the wire binding prior to interengagement of the bights, and the other of said slots running at substantially a right angle to the first slot and spaced therefrom and from that end of the strip, a tongue at the other end of the strip bent over the interengaged bights on the end of the wire binding and extending through the second slot to encase the interengaged bights, the tongue and the opposite end of the strip being united by piercing and crimping the metal of the strip to seal the encasement of the interengaged bights.

2. In combination with a wirebound box having interengaged wire ends at the closing corner of the box, a seal comprising a metallic strip having a pair of slots extending therethrough, one of said slots being located centrally of the strip to receive one of the wire ends prior to interengagement of the wire ends, and the other of said slots being located intermediate the first slot and one end of the strip, a tongue at the other end of the strip bent over the interengaged wire ends and extending through the second slot to encase the interengaged wire ends, the tongue and the opposite end of the strip being united by piercing and crimping the metal of the strip to seal the encasement of the interengaged wire ends.

ALFRED L. ROSENMUND.